United States Patent [19]
Meeker

[11] 3,875,856

[45] Apr. 8, 1975

[54] HIGH SPEED TRANSPORTATION MEANS FOR SMALL VEHICLES

[76] Inventor: Martha C. Meeker, 5768 N. Ewing, Indianapolis, Ind. 46220

[22] Filed: Oct. 24, 1972

[21] Appl. No.: 300,425

Related U.S. Application Data

[63] Continuation-in-part of Ser. No. 85,567, Oct. 30, 1970, , which is a continuation-in-part of Ser. No. 837,968, April 1, 1969, Pat. No. 3,575,454, which is a continuation-in-part of Ser. No. 556,187, June 8, 1966, abandoned.

[52] U.S. Cl.......... 104/23 FS; 104/148 LM; 310/13
[51] Int. Cl............................................. B61b 13/08
[58] Field of Search.... 104/88, 23 FS, 134, 148 LM

[56] References Cited
UNITED STATES PATENTS

| | | | |
|---|---|---|---|
| 3,111,092 | 11/1963 | Raviolo | 104/23 FS |
| 3,111,093 | 11/1963 | Jay | 104/23 FS |
| 3,233,559 | 2/1966 | Smith | 104/23 FS |
| 3,333,550 | 8/1967 | Gorman | 104/23 FS |

Primary Examiner—M. Henson Wood, Jr.
Assistant Examiner—D. W. Keen
Attorney, Agent, or Firm—Woodard, Weikart, Emhardt & Naughton

[57] ABSTRACT

A high speed transportation means for small privately owned bi-modal vehicles providing vehicle guidance, stabilization and support by tracked air bearings and propulsion and speed control by an energized central rail. The vehicle has wheels for operation on conventional roads. The wheels are retractable for vehicle operation on a three rail aerolane having an electrically charged center rail. Two legs are fixedly fastened under the vehicle and are positionable about the center rail. Two support and stabilization assemblies are mounted to the vehicle and engage the remaining two rails. Air bearings are provided between the rails and the two support and stabilization assemblies. Emergency skis are mounted to the support and stabilization assemblies.

26 Claims, 9 Drawing Figures

INVENTOR
MARTHA C. MEEKER
BY
Woodard Weikart Emhardt & Naughton
ATTORNEYS

INVENTOR
MARTHA C. MEEKER
BY
Woodard Weikart Emhardt & Naughton
ATTORNEYS

HIGH SPEED TRANSPORTATION MEANS FOR SMALL VEHICLES

CROSS REFERENCE TO RELATED APPLICATIONS

The present invention is a continuation-in-part of co-pending application, Ser. No. 85,567, filed Oct. 30, 1970 which is a continuation-in-part of application Ser. No. 837,968, filed Apr. 1, 1969 and issuing as U.S. Pat. No. 3,575,454 which is a continuation-in-part of application Ser. No. 556,187, filed June 8, 1966 now abandoned.

BACKGROUND OF THE INVENTION

1. Field of the Invention

This invention is in the field of high speed guideway transportation systems for small vehicles.

2. Description of the Prior Art

Numerous ideas in vehicle transport have been proposed to help solve the many problems of existing modes of transportation. Some of the ideas include: personal rapid transit vehicles; safety devices; automated or electronic highways for guidance and speed control of contemporary automobiles; efficient fume free types of propulsion, friction-free support systems for land, tunnels, or existing rail systems; and dual-purposed vehicles which travel on monorails, waterways or on existing roads and rails. A representative sample of the prior art in this field is disclosed in the following U.S. Pat. Nos.

| | |
|---|---|
| 891,882 | Valentine |
| 2,864,318 | Toulmin |
| 3,147,714 | Appelt |
| 3,225,704 | Gilvar |
| 3,233,559 | Smith |

High speed train transportation systems have been built in several countries. Such improved trains are needed in many areas of this country, but they would solve only a portion of the total transportation problem. Also needed is a new means of high speed transportation to relieve over-crowding of all present transportation systems nationally; not just in densely populated corridors. The new system must be one that people will use; one that is comparatively inexpensive to construct and maintain and is not outdated before its construction is completed; one that is flexible enough to integrate existing means of transportation with the new means into a national transportation network without causing great disruption to present means; one that requires little or no land acquisition; one that permits national planning for population and urban growth by permitting the location and planning for new urban and suburban centers of the future; one that permits a degree of regulation of the flow of people and vehicles nationally; and one that is totally safe having eliminated all of the hazards and flaws, including those of driver error and pollution, of the existing transportation means. Such a new concept of transportation, it is felt, is hereby proposed.

Proposed electronic or automated highways for use by privately owned contemporary or unicontrol vehicles, like the new high speed rails, largely depend upon the vehicle's system for support and/or propulsion means. Privately owned vehicles which are to travel on these proposed high speed highways are maintained by their respective owners. No control, therefore, over the vehicle's condition can be exercised by the highway operators. The vehicles could quite possibly fail, even though checked before entry, at high speed causing even greater chaos and more deaths than on today's lower speed conventional highways.

SUMMARY OF THE INVENTION

This invention is a high speed transportation means for small vehicles. The aerodynamically contoured vehicle has wheels for conventional highway operation. These wheels are retractable for vehicle operation on a guideway having three rails. The two outside rails support and guide the vehicle while the center rail provides a constant speed linearly traveling magnetic field for vehicle propulsion. The center rail receives two downwardly extending legs mounted to the bottom of the vehicle. The vehicle is propelled and its speed controlled by the attraction of the linearly traveling magnetic fields in the center rail and the two vehicle legs. Two support and guidance assemblies are mounted to the vehicle and engage the two outside rails. Air nozzles are provided forcing compressed air between the two outside rails and the two support and guidance assemblies thereby providing a frictionless contact. Magnesium tipped skis or rollers are mounted to the vehicle's support and guidance assemblies and are abuttable against the two outside rails for emergency support and stabilization of the vehicle in the event of failure of the rails compressors.

It is an object of the present invention to provide a vehicle operable under driver control or conventional highways and additionally operable on an electrically charged high speed guideway where it is not driver controlled.

It is an additional object of the present invention to provide the previously described vehicle which will hold a relatively small number of people with an aerodynamic contour, retractable wheels, conventional control and propulsion means, and, unloaded, a specific center of gravity.

It is an additional object of this invention to provide the previously described vehicle with a permanent underside transport device or a permanent underside fitting to receive an attachable transport device for high speed aerolane travel.

It is a further object of the present invention to provide the vehicle with electrical propulsion and speed control means while traveling on a high speed aerolane.

Yet a further object of the present invention is to provide the previously described vehicle with frictionless support, stabilization and guidance means while traveling on said aerolanes and emergency supports in the event said means fails.

Related objects and advantages of the present invention will be apparent from the following description.

Figure 4:
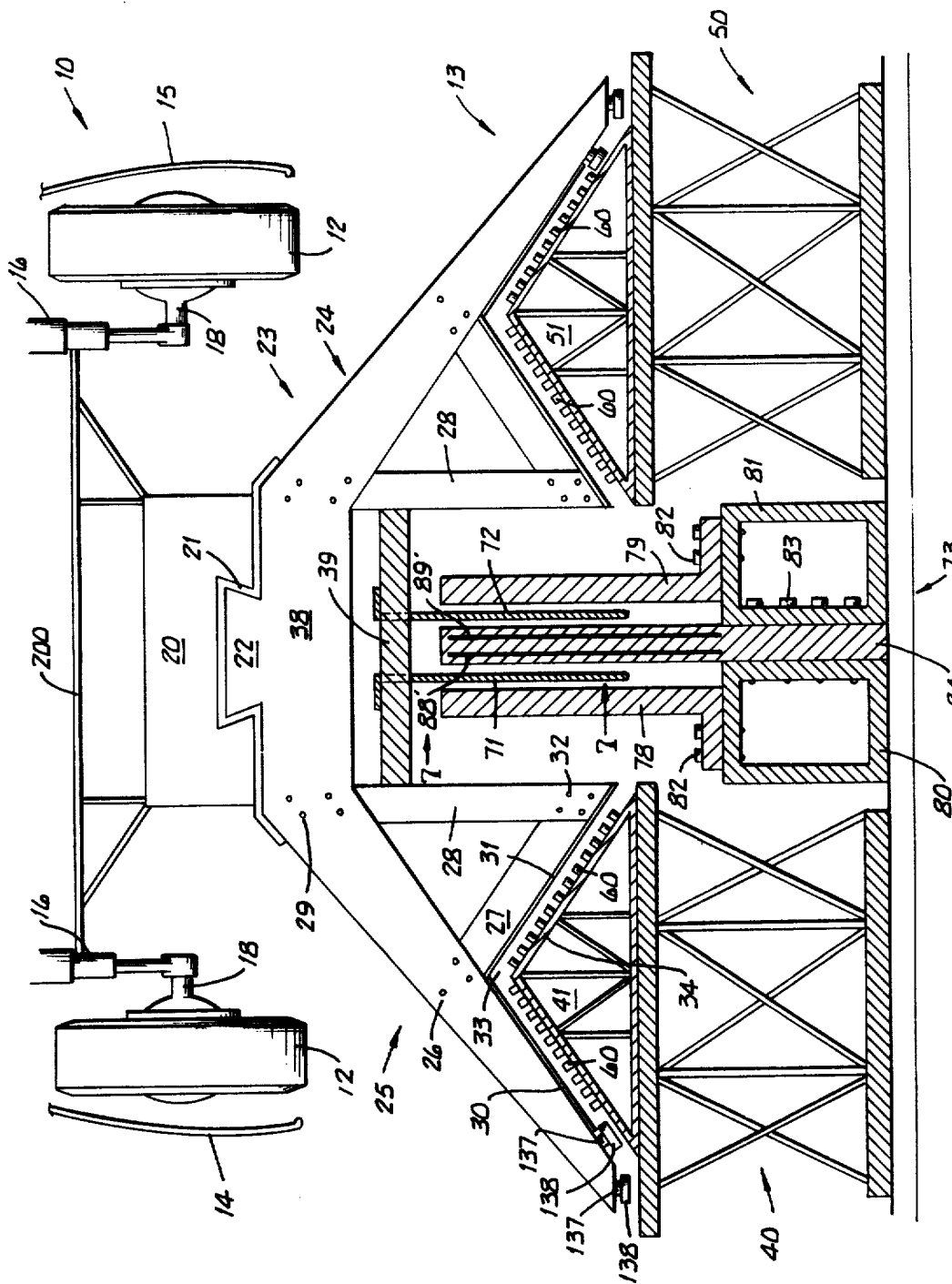
FIG. 4 is a fragmentary sectional view taken along line 4—4 of FIG. 3 and viewed in the direction of the arrows showing the first embodiment transport device attaching the vehicle to the first embodiment of the deway.

IG. 5 is the same view as FIG. 4 only illustrating the ond embodiment transport device for attaching the icle to a second embodiment of the guideway.

IG. 6 is the same view as FIG. 4 only showing the d embodiment permanent underside fitting for attaing the vehicle to a third embodiment of the guide-. In addition, FIG. 6 shows a sectional view of the icle.

IG. 7 is a fragmentary enlarged side elevation ved in the direction of arrows 7—7 of FIG. 4 showthe positioning of the conductors in the vehicle's actable legs.

IG. 8 is a perspective fragmentary view of the three se windings in the center rail.

Figure 6:
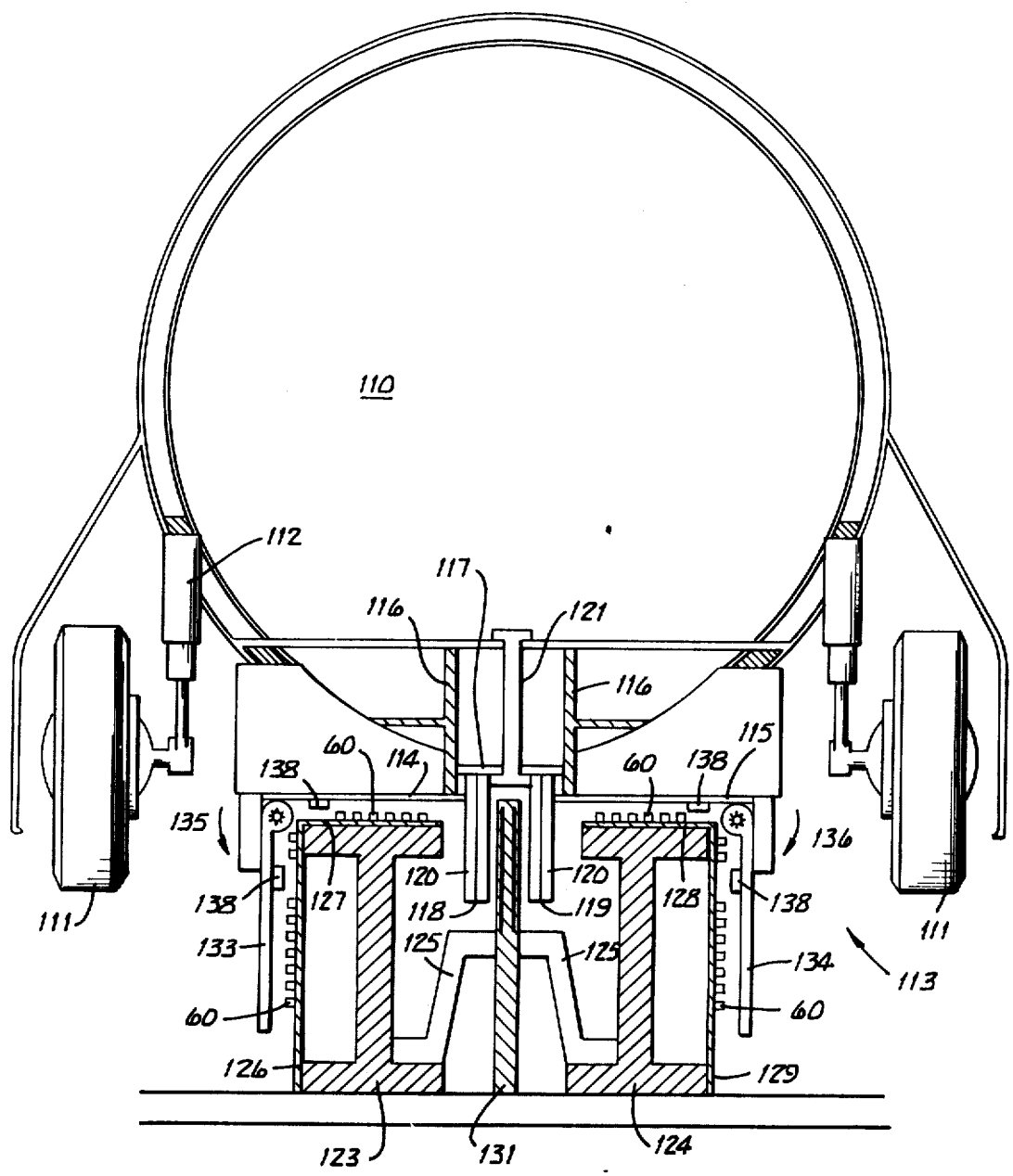

IG. 9 is the same view as FIG. 6 only fragmented showing the vehicle's permanent underside fitting he stored position with the wheels extended for road ration.

DESCRIPTION OF THE PREFERRED EMBODIMENTS or the purpose of promoting an understanding of principles of the invention, reference will now be le to the embodiments illustrated in the drawing specific language will be used to describe the same. ill nevertheless be understood that no limitation of scope of the invention is thereby intended, such altions and further modifications in the illustrated de-, and such further applications of the principles of invention as illustrated therein being contemplated would normally occur to one skilled in the art to ch the invention relates.

his invention is a high speed means for small vehi- which permits vehicular travel at high speeds on an olane (guideway) where none of the vehicle's sysis are operative or required for such travel. The conon, therefore, of the privately owned vehicles is not fety factor in the aerolane's operation. These aeroamically contoured bi-modal vehicles have wheels conventional highway operation wher it is driver itrolled. The wheels are retractable for vehicle oper-n on a guideway or aerolane, having three rails dly mounted to a base. The two outside rails sup-t, guide and stabilize the vehicle while the center provides the electrical power for propulsion and ed control.

he first embodiment of the center rail of the railway three upstanding and parallel arms spaced apart for eiving two downwardly extending legs mounted to bottom of the vehicle. The middle upright arm of center rail contains electrical windings which, when rgized by a high frequency 3 phase current, produce constant speed linearly traveling magnetic fields. two outer upright arms are ferromagnetic rails ich attract the center arm's magnetic fields and proe a path for the flux which the vertically positioned iductors of the two downwardly extending legs unted to the vehicle cut as the flux travels outwardly m the rail's center arm to the outer ferromagnetic is. Currents are thereby induced in the vehicle con-tors of the vehicle's downwardly extending legs in h a direction that they react with the field which duces them to develop torque in the direction of the ucing field so that the conductors of the vehicle tend follow the center rail linear advancing magnetic field; hence, the linear propulsion for the vehicle. If the vehicle is slowed from its constant speed by headwinds and/or inclines, the induced currents become more and more out of phase with the flux which increases the torque or power. By the same method, in reverse, if the vehicle's speed is increased above that of rail speed, the induced currents become out of phase in the opposite direction producing torque which slows the vehicle back to rail speed. A relatively constant speed and speed control for the vehicle is thereby provided by the aerolane. The second embodiment of the center rail of the guideway is similar to the first embodiment but has the outer rails spaced farther apart.

The third and preferred embodiment of the center rail of the guideway has only one upstanding arm containing the electrical windings which, when energized, produce two constant speed linearly traveling magnetic fields. The two downwardly extending legs mounted to the underside of the vehicle straddle the central arm. The legs contain vertically positioned conductors on their inner sides and ferromagnetic flux attracting members on their outer sides. Propulsion and speed control for the vehicle is provided as described above in the 1st embodiment. Two support and guidance assemblies are mounted to the vehicle and engage the two outside rails of the aerolane. Air nozzles are provided on the outer rails forcing compressed air between the two outside rails and the vehicles two support and guidance assemblies thereby providing a frictionless contact. Magnesium tipped skis or rollers are mounted to the support and guidance assemblies and are abuttable against the two outside rails to support, stabilize and guide the vehicle in the event of any absence of the compressed air.

The bi-modal vehicle being capable of high speed aerolane travel is of aerodynamic contour, teardrop in shape and of one basic weight (within allowable limits) and construction, with interiors alterable in order that they may be used as passenger vehicles, small commuter or jitney-type buses, vans for freight, campers, etc. The vehicles could also be built unpowered for use as trailers. The propulsion for conventional driver controlled road use would preferably be provided by a fume-free source. Permanently attached to the underside of the vehicle is a fitting capable of receiving a transport device necessary for aerolane travel or, preferably, a permanent transport device. The vehicle further has a predetermined center of gravity, by construction rather than by correction. If an electric motor is used, for instance, and is located in the rear of the vehicle, its weight could be offset by the positioning of the batteries and/or heavier framing in the front of the vehicle; thus enabling the vehicle to be supported level by the air bearing means of the guideway when unloaded.

The guideways are preferably elevated over present interstate highways and extend unbroken between any two given metropolitan areas; preferably between urban Transportation Centers located in the suburbs of metropolitan areas along suburban highway loops. One guideway or aerolane would be provided for each direction of travel. Parking for vehicles could be provided at such Transportation Centers and mass transportation provided for people, not vehicles, into city centers, to airports and train stations; thereby linking all present transportation means; providing a control means for the flow of vehicles into city centers; relieving the overcrowding of all present transportation means; and providing a new additional high speed transportation means once the aerolanes were constructed nationally or internationally. The aerolanes would be prefabricated in span lengths of 120 feet to 130 feet and require little maintenance. No rolling stock need be purchased, maintained or replaced by the aerolane operators, no highly skilled pilots or engineers or other on board crews are required, nor are computers for reservations or printed schedules. The aerolanes would be relatively inexpensive to build, operate and maintain. Vehicles are fitted with a transport device or, preferably, extend their permanent underside transport device downward after arrival at the aerolane terminal; given air bearing support by being driven under their own power onto the aerolanes two outer rails which contain the air bearing means; retract their wheels used in conventional road operations; mechanically pulled to a catapult capable of handling 3 to 5 other vehicles and thrust at 5 to 8 second intervals along the aerolane so as to arrive at the central energized portion of the aerolane at rail speed. An energized entry rail could also be used to bring vehicles up to rail speed. The latter speed would be a predetermined constant set from 150 mph to 200 mph. The speeding vehicle would electromagnetically trigger switches energizing rail spans ahead of it at the exact instant that it deenergized rail windings in spans just traversed; thereby tending to keep power transmission even throughout the rail. As the vehicle approaches its terminal, the constant speed energized portion of the rail terminates and the vehicle is slowed with the aid of aerodynamic drag along a non-energized exit rail, by dynamic braking, by external mechanical means or a combination of all three. Its mechanical docking is electronically controlled.

Figure 1:
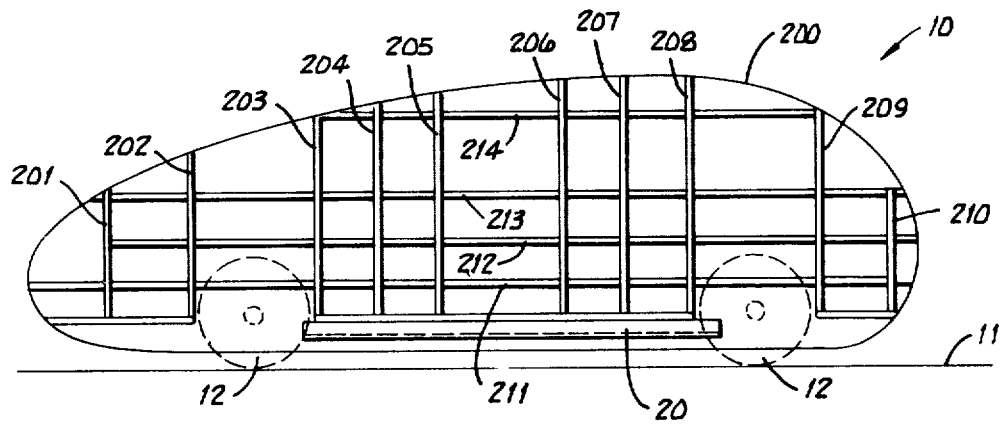
FIG. 1 is a side elevation of the vehicle having its outer skin removed.
Figure 2:
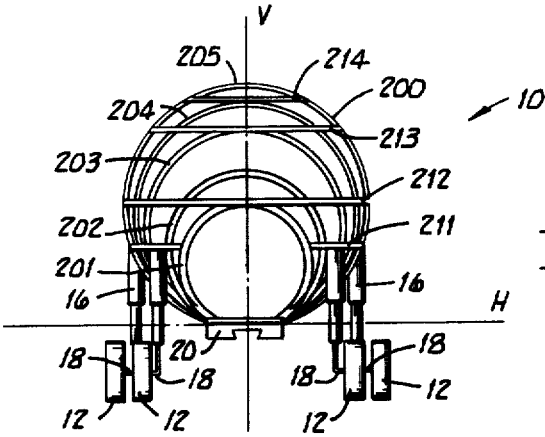
FIG. 2 is an end view of the vehicle of FIG. 1.

Referring now more specifically to FIG. 1, vehicle 10 is operable on highway 11 by wheels 12 rotatably mounted to the vehicle. Vehicle 10 is also operable on guideway 13 (FIG. 3) by retracting wheels 12 and engaging the separate rails of the guideway. The outer skin has been removed from vehicle 10 in FIGS. 1 and 2 to more clearly show the configuration of the vehicle frame. Vehicle 10 has a heavy duty unitized frame 200 with circular bulkheads 201 through 210 varying in diameter to provide an egg or teardrop shaped construction with the lowest section of each bulkhead being level, parallel and equi-distant from the roadway. The circular bulkheads are rigidly braced longitudinally by stuts 211, 212, 213 and 214. The stuts are secured to the bulkheads by welding or other suitable means. Aluminum plates, not shown, surround the passenger section from window level to floor to provide passenger protection from piercing objects in the event of a collision on a conventional highway. The egg shape configuration provides a strong crush resistant frame while providing a shape with an aerodynamic drag coefficient of 0.19 or less. A pneumatic hydraulic suspension jack 16 (FIG. 2) is attached to each wheel axle 18 for retracting wheels 12 upward. The jacks are operated by one pump and are two positioning; thereby, acting as the vehicle's road suspension means while extended for operation on a highway as shown in FIG. 2, and also acting to raise the wheels and wheel axles approximately 8 inches into the vehicle side skirts rendering the vehicle more aerodynamic while on the railway of FIG. 3. Two each similar but smaller pneumatic-hydraulic jacks operating off the same pump, may be used to project the front and rear bumpers outward from the vehicle frame. Said two-positioning jacks not only render the bumpers shock absorbing, when in an extended position, but also effect the retraction of the bumpers enabling them to become flush with the vehicle outer skin; thereby drastically improving the vehicle aerodynamics for guideway travel. The outer skin and skirts for the vehicle are produced from light weight semi-flexible metal or fiber glass and are contoured to reduce the aerodynamic drag on the vehicle. The skin flares out on either side forming skirts 14 and 15 (FIG. 6) to cover the wheels when retracted. The vehicle may be powered electrically, by fume-free gas, or a gas turbine engine while driven on the highway. For example, a 15 to 17 horsepower rear mounted electrical motor (not shown) might be used in conjunction with a transmission and differential for conventional road propulsion. The horizontal H and vertical V axis (FIG. 2) pass through and intersect at the center of the underside fitting. The unloaded vehicle has by design and construction a specific center of gravity which is located at the intersection of the H axis and the V axis at a point located at ½ the longitudinal length of the underside fitting. The vehicle further includes appropriate safety features, including the location of seats against circular bulkheads rather than entry doors and suitable control apparatus for braking, steering and motor control for use when vehicle driver operated on conventional roads.

Figure 3:
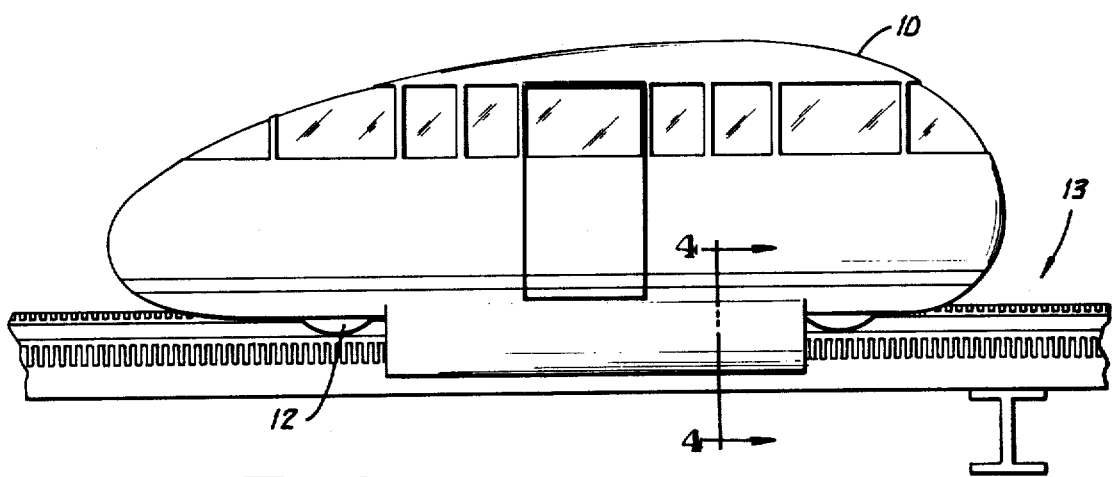
FIG. 3 is a side elevation of the vehicle of FIG. 1 shown operating on a guideway.

FIG. 4 is a fragmentary sectional view taken along line 4—4 of FIG. 3 and viewed in the direction of the arrows showing the first embodiment structure for attaching the vehicle to the first embodiment of the guideway.

Integrally connected to frame 200 is a permanent nonferrous fitting 20 which extends longitudinally along the middle of the vehicle's underside approximately from the front wheels to the rear wheels. The lower surface of the fitting has a truncated triangular groove 21 extending the length of fitting 20 which is adapted to slide onto and securely engage a truncated triangular solid 22 of nonferrous metal projecting upwardly and extending longitudinally along the upper surface of an attachable transport member 23. Solid 22 is integral with body 38.

Transport device 23 is slidably positioned on guideway 13 and is detached from fitting 20 whenever vehicle 10 is not positioned over the guideway. Suitable clamping devices mounted to the ends of fitting 20 retain and lock fitting 20 onto solid 22. Transport device 23 is constructed of light weight aluminum and has two support and guidance assemblies 24 and 25 integral with main body 38 for supporting and guiding the vehicle. Assemblies 24 and 25 are identical and thus the following description of assembly 25 will apply equally to the assembly 24. Members 27 and 28 (FIG. 4) are fixedly connected together by rivets 32 or other similar fastening means. The opposite ends of members 27 and 28 are fixedly mounted to body 38 by rivets 26 and 29 thereby forming an inverted V configuration 33 complementary to the upper portion 34 of truss 40. Members 27 and 28 may be one V shaped framing member instead of two separate pieces. A sheet metal piece 30 is fixedly mounted to the lower surface of body 38. A second sheet metal piece 31 is fixedly mounted to the lower surface of member 27 and extends with sheet 30 the length of fitting 20. Both sheets form the surfaces which act to support, stabilize and guide the vehicle when it is passing over the air jets 60, issuing air at high velocity and high pressure, mounted to trusses 40 and 50 along the length of the aerolane.

Figure 7:
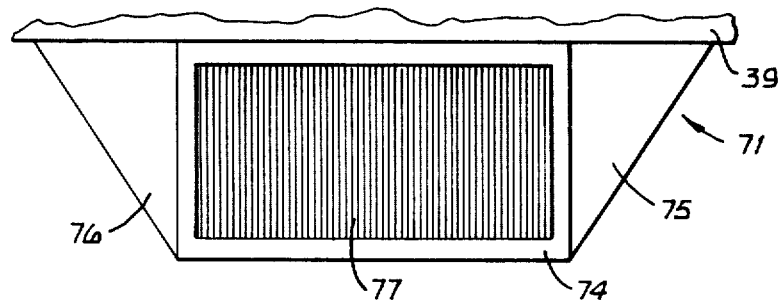

Mounted between members 28 is a brace 39 which extends the entire length of transport device 23. Suspended from brace 39 are two legs 71 and 72 which extend into center rail 73 positioned between trusses 40 and 50. Legs 71 and 72 are electrically insulated from brace 39. FIG. 7 is a side view of a portion of leg 71 which is identical to leg 72. Leg 71 is attached to brace 39 by brackets 76 and 75 having frame 74 secured therebetween. Conducting rods 77 are secured in vertical grooves in frame 74.

Figure 8:
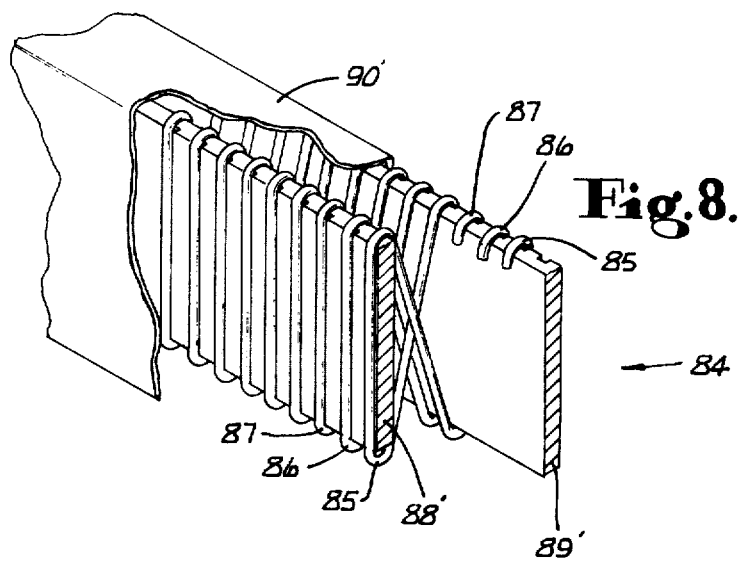

Center rail 73 (FIG. 4) has two L shaped arms 78 and 79 mounted atop channels 80 and 81 by fasteners 82. Channels 80 and 81 are secured together by fasteners 83 with arm 84 positioned between the channels. Leg 71 fits freely between arms 78 and 84 whereas leg 72 fits freely between arms 84 and 79. The arms and channels extend continuously along the energized portion of the guideway. Arms 78 and 79 are made from ferromagnetic material which attracts and concentrates the magnetic field produced by electrical windings housed in arm 84 and provides a path for the flux. A three phase high frequency network is housed within arm 84. The network has three electrical cables 85, 86 and 87 (FIG. 8) continuously wound around a pair of parallel steel plates 88' and 89' enclosed by a fiber glass covering 90'. Slots are provided in the outside surfaces of plates 88' and 89' to receive the cables. The plates are rigidly braced and supported (not shown) within housing 90'. The wire windings of arm 84, when energized with sufficient current to propel the vehicle at a predetermined constant speed, set up fields of magnetic flux which are strong enough to be attracted by and travel through arms 78 and 79; thereby, helping to increase the strength of the magnetic fields by providing a path for the flux. The three phase windings (FIG. 8) are wound to provide two linearly traveling magnetic fields one on each side of arm 84. As the vehicle approaches any given span of the rail, the rail is energized by a suitable trip switch in time for the fields to be full strength by the time the vehicle arrives at that span. If the vehicle slows the lines of flux are then cut by the conductors of legs 71 and 72 inducing currents in the conductors. The direction of these induced currents are such that they react with the magnetic field to develop torque in the direction of the inducing field so that the conductors tend to follow the lineary advancing magnetic field. If the vehicle is slowed from its constant speed by headwinds and/or inclines, the slip will increase and the rate of cutting of the flux by the conductors will also increase. The induced currents in legs 71 and 72 then become more and more out of phase with the flux which increases the torque or power. If the vehicle speed is increased by declines and/or tail winds, the induced currents become out of phase in the opposite direction producing torque which will slow the vehicle back to rail speed. There is one main source of power for all the aerolanes going in one direction for any given set of lanes. Currents to the various lane windings and compressors are triggered on electromagnetically by the approaching vehicle, 2 or four spans at a time, at the exact instant that power is shut off in the two to four lanes just traversed; thereby aiding power transmission.

Power transmission, it is felt, would be greatly improved if the vehicle's speed was determined by the span lengths or vice versa. For instance; if the vehicle traveled at 170 mph (250 ft/sec) and the spans were 125 ft. long each, the vehicle would travel 2 spans per second. Since the rail is prefabricated in span lengths, it would follow that the rails would energize in multiples of 125 feet. If the rail and air compressors are energized 2 spans at a time; then the power will be shut off in the two spans behind the vehicle at the exact same instant power is cut into spans located 4 to 6 second traveling time further down the aerolane.

Mounted on each of the flat upper surfaces of trusses 40 and 50 (FIG. 4) are triangular shaped structures 41 and 51 whose two upper surfaces provide support for air jets 60 which exhaust high pressure high velocity air upwards; thereby, creating air support and guidance for the vehicle. Compressors for this air bearing system are provided along the aerolanes and are activated by the approaching vehicle two to four spans at a time in the same manner as the rail windings are energized.

Figure 5:
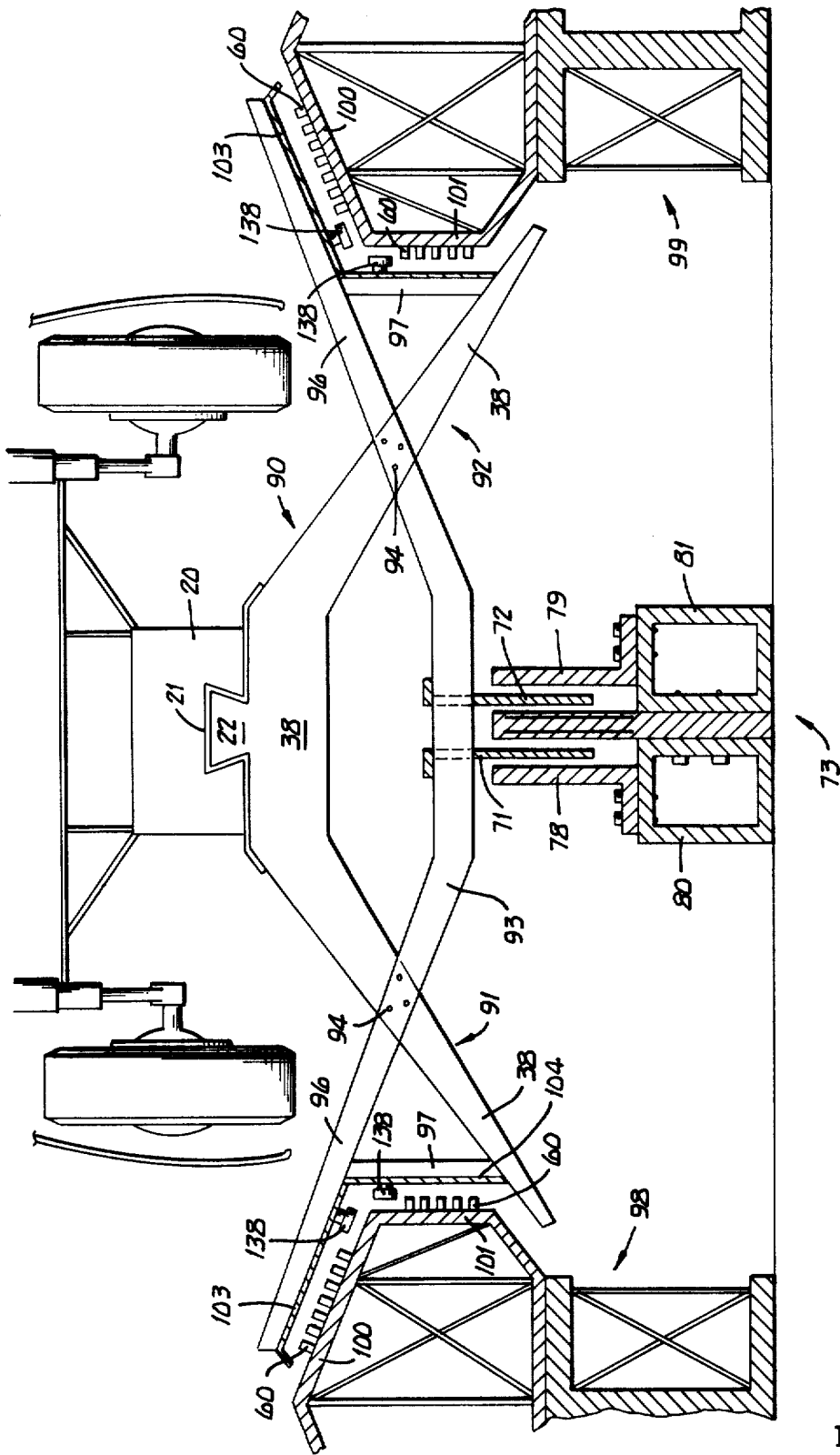

A second embodiment 90 of the transport device is shown in FIG. 5 and is wider than the structure of FIG. 4 in order to lower the vehicle center of gravity. The vehicle has an identical fitting 20 as previously described being engageable with solid 22 of main body 38. Support and guidance assemblies 91 and 92 are integrally attached to body 38 similar to 24 and 25 previously described. Legs 71 and 72 are suspended by assembly brace 93 which is mounted to assemblies 91 and 92 by rivets 94. Extension 96 is riveted to brace 93 and body 38 and is spaced apart from body 38 by members 97 fixedly mounted thereto. Metal sheets 103 and 104 are fixedly attached to extensions 96 and members 97 receiving the air blast from air jets 60 mounted on members 100 and 101 of trusses 98 and 99. The second embodiment of the guideway (FIG. 5) is similar to the guideway of FIG. 4 but instead has the outer rails spaced farther apart being configured to receive the support and guidance assemblies 91 and 92. The second embodiment of the transport device (FIG. 5) could house (not shown) a linear induction motor and an air compressor on board picking up electrical power for them along the rail. Such on board means would necessitate the air nozzles also being on board attached to surfaces 103 and 104 which would issue high velocity high pressure air against surfaces 100 and 101 of the guideways support and guidance assemblies. Such on board assemblies are not preferred for safety reasons since the failure of a linear motor, a compressor, or a power pick up device on any one vehicles transport device could cause high speed collisions unless all vehicles were automatically and similarly disabled. With the linear induction motor windings and the air support means, however, both being provided by the guideway, a power failure automatically shuts down all systems and vehicles aboard the transport devices simultaneously.

To place the vehicle of the first two embodiments on the rail, the vehicle under its own power with wheels already retracted is driven along a ramp so that it straddles a well. Wheel guides position the vehicle as desired in relationship to the well. The upper portion of the transport device will protrude up through the well at the exact level to make a perfect contact with the aerovehicle's permanent underside fitting 20. Overweight vehicles would be conspicuous immediately and rejected for aerolane travel. The transport device already resting on the aerolane would be readily slid into place from either the front or the rear of the vehicle. The first and second embodiments of the device attaching the vehicle to their respective aerolanes (guideways) are fairly similar; however, the third and preferred embodiment is substantially different.

Figure 9:
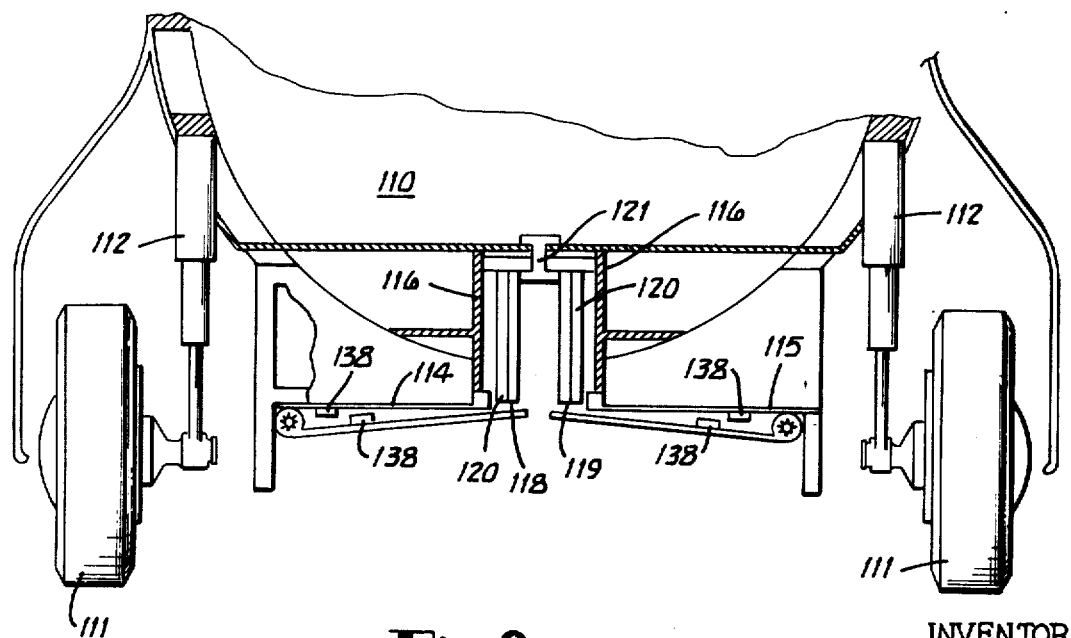

The third embodiment of the structure attaching the vehicle to the aerolane is permanently attached to the underside of the vehicle as shown in FIGS. 6 and 9. FIG. 6 further illustrates a third embodiment of the guideway.

Vehicle 110 has retractable wheels 111 rotatably mounted to wheel pneumatic-hydraulic suspension shocks 112. Channels 116 slidably house brace 117 having downwardly extending legs 118 and 119 monnted thereon. Brace 117 is movable vertically by two or more rods 121. Rods 121 can be electrically, hydraulically or manually pulled up through the vehicle's floorboard and clamped flat against the floor-board (FIG. 9), thus retracting the entire assembly into the well for storage when the vehicle is not on the aerolane. Thus, legs 118 and 119 may be raised or lowered to engage center rail 131. Rail 131 is identical to arm 84 of FIG. 4 and is straddled by the downwardly extending legs 118 and 119. Rail 131 is centered and braced between I-beams 123 and 124 by a plurality of bracing members 125. Ferromagnetic plates 120 attached to legs 118 and 119 attract and provide a path for the magnetic flux produced by the windings in rail 131 when energized. Vertically positioned rods identical to rods 77 previously described and shown in FIG. 7, in legs 118 and 119 cut the flux traveling through the air space between rail 131 and ferromagnetic plates 120; thereby inducing currents in legs 118 and 119. Propulsion and speed control for the vehicle is the same as previously described in the first embodiment of the rail assembly.

Plates 127 and 128 are fixly mounted to the top of I-beams 123 and 124 and have air jets 60 for exhausting high pressure high velocity air against plates 114 and 115 mounted to the bottom of the vehicle's permanent underside transport fitting 113. Side plates 126 and 129 are vertically mounted to I-beams 123 and 124 and also have air jets 60 for directing compressed air toward vertical plates 133 and 134 pivotally mounted to the underside of the vehicle. When it is desired to operate vehicle 110 on conventional roads, plates 133 and 134 are pivoted electrically, hydraulically, or manually in the direction of arrows 135 and 136 abutting plates 114 and 115 after legs 118 and 119 and plates 120 have been retracted as previously described (FIG. 9).

Magnesium tipped skis or rollers are attached to the structure of FIGS. 4, 5 and 6 to support and guide the vehicle in case the compressed air system fails. As previously described, the guideways three rails are prefabricated in 125 foot spans. By design, compressors along the guideway service two spans in each aerolane on the elevating structure. If there were two aerolanes going north and two south, each compressor would service eight 125 foot spans (2 on each of the 4 lanes). If any one compressor malfunctioned, only those eight spans would be affected. Since the aerovehicles are traveling 170 mph (250 ft/sec. or 2 spans/sec.), then air support and guidance is lost for only 1 second traveling time on each of those 4 lanes. For that second, the emergency skis or rollers would support and guide the vehicles traversing the two spans and only a slight bump or jar would be felt by the vehicle's occupants.

The aerolanes air support and guidance means could be developed capable of holding vehicles securely on the guideway for crosswinds up to a certain force plus a safety factor. For storm or gale winds, the lanes would have to be shut down or depend on mechanical limiting means (none shown in drawings) for stability. Windshields, too, could be placed along the aerolanes where there are known to be relatively constant crosswinds of considerable force. The aerovehicles basic design, however, is such that crosswinds would not have as great an effect upon them as they would on vehicles of contemporary design.

It will be obvious from the above description that the present invention provides a dual-purpose vehicle operable under driver control on conventional highways and at high speeds on electrically charged railways under other than driver control. In addition, it will be obvious that the vehicle has a frictionless support means and emergency supports.

The described transportation means may be varied greatly in use and design. For example, a larger version of the aerolane might be built to accommodate a 30 to 40 passenger aerobus. A permanent fitting similar to but larger than that of the third embodiment would extend longitudinally along the underside of the bus. When aerolane travel is desired, the bus under its own electrical or turbine power would be driven along wheel guides so that it straddles a well. Its fitting would then be extended downward hydraulically or electrically and, still under its own power, be driven onto the aerolane arriving at the energized portion of the lane at considerably under rail speed. Its motor would then be turned off with the aerolane providing propulsion, speed control, air bearing support, guidance and stabilization. The driver could accelerate the aerobus by lowering additional conductors into the magnetic fields of the energized rail below it. Once it is at rail speed, the additional conductors would be raised and stored in the fittings well on the underside of the bus. As the aerobus approached its terminal, the energized rail would end, and it would coast by design of the aerolane, into the terminal at low speed with its air support being gradually lowered until its wheels were back on pavement enabling it to brake itself, retract underside fittings and, under its own power, proceed conventionally about the city, airport or suburbs. Speeds on the aerobus guideways would be considerably lower than those on the high speed small vehicle cross-country aerolanes. Aerobuses, while on the guideways, would not require wheel retraction for the lowered speeds nor would the small aerovehicles traveling lower speed urban or suburban aerolanes. It should be further mentioned that any small bi-modal or dual-mode vehicle which is bult for sale to the public should be not only capable of travel on a high speed cross-country guideway network, but also capable of travel on the lower speed urban guideway version of it or vice-versa. In other words, the cross-country guideways and urban guideways for small vehicles shluld be compatible; thereby making possible the sale of tri-modal vehicles, such as the vehicle of this invention, to the public. Another variation in design might include guidance members 133 and 134 of the vehicle's underside fitting being positioned in other than strictly a verticle position as shown in FIG. 6 when the vehicle is traveling the guideway. Such an alternate position might include an inward slant to their respective lower halves and a corresponding slant to the air support members 126 and 129 of the guideway to aid in vehicle stabilization. Another variation might include longitudinally cut grooves in the vehicle fittings support members 114 and 115 and guidance members 133 and 134 (FIG. 6). Such grooves serve to direct the air currents longitudinally along and under said vehicle to aid in its support and to aid in its stabilization while said vehicle is traveling on the aerolanes.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. A high speed transportation means comprising:
   a source for powering said transportation means a 3 phase high frequency electrical power;
   a railway track connected to said source and including a first rail, a second rail being parallel to said first rail and spaced a fixed distance from said first rail and, an electrically charged third rail being positioned equidistant between and parallel with said first rail and said second rail, said third rail having a first arm with three cables wound therein connected to said source of electrical power for producing two linearly traveling magnetic fields;
   a dual mode vehicle movably mounted on said railway track;
   a first leg and a second parallel leg in spaced relation to each other and mounted centrally and longitudinally to and under said vehicle, said first and second leg having conductance and being positionable adjacent and on either side of said first arm of said third rail for moving through said fields and producing a force on said vehicle in the direction of said fields of said third rail;
   a first support and stabilization assembly mounted longitudinally to and under said vehicle positionable adjacent said first rail for supporting and guiding said vehicle on said first rail;
   a second support and stabilization assembly mounted longitudinally to and under said vehicle positionable adjacent said second rail for supporting and guiding said vehicle on said second rail;
   air bearing means operable to provide an air cushion between said first rail and said first support and stabilization assembly for support of said vehicle and an air cushion between said second rail and said second support and stabilization assembly for support of said vehicle when said vehicle is positioned on said first rail and said second rail, said air bearing means being fixedly mounted to said first rail and said second rail;
   retractable wheels rotatably mounted to and under said vehicle for supporting said vehicle when said vehicle is not mounted on said first rail, second rail and third rail; and wherein said vehicle is capable of conventional road travel where it is driver controlled and further comprising:
   a frame of round rigidly braced bulkheads of varying diameters permitting a streamlined aerodynamic contour for said vehicle with low drag and a maximum drag coefficient of 0.20, said frame having said first support and stabilization assembly, said second support and stabilization assembly, said first and second leg and said wheels mounted thereto.

2. The transportation means of claim 1 and further comprising a fitting connecting said first support and stabilization assembly and said second support and stabilization assembly to said frame; and wherein:
   said vehicle has a specific center of gravity located by design and construction at the longitudinal center of said fitting allowing said vehicle to be supported equally by said air bearing means on said first support and stabilization assembly and said second support and stabilization assembly.

3. The transportation means of claim 2 wherein:
   said first leg and said second leg are retractable into said vehicle; and,
   said first and second support and stabilization assemblies each have a plate fixedly mounted horizontally to said vehicle and another plate hinged to said vehicle and pivotally movable from a vertical position when in use to a horizontal position when not in use.

4. The transportation means of claim 3 additionally comprising:
   magnesium tipped skis fixedly mounted to said first and second support and stabilization assemblies being slidingly abuttable against said first and second rails to prevent contact between said support and stabilization assemblies and said first and second rails in case of failure of said air bearing means.

5. The transportation means of claim 1 additionally comprising:
   a transport device having said first and second support and stabilization assemblies and said first and second legs fixedly attached thereto;
   a fitting fixedly mounted centrally and longitudinally to and under said vehicle being removably connected to said transport device allowing said transport device to be removed from said vehicle when said dual mode vehicle is to be operated on said wheels;
   magnesium tipped skis fixedly attached to said first and second support and stabilization assemblies being slidingly abuttable against said first and second rails to prevent contact between said support and stabilization assemblies and said first and second rail in case of failure of said air bearing means; and wherein:
   said third rail has a second and third arm parallel with and positioned adjacent said first arm.

6. The transportation means of claim 5 wherein:
   said first leg is positioned between said first and second arms and said second leg is positioned between said first and third arms.

7. The transportation means of claim 6 wherein:
   said first and second support and stabilization assemblies each have a V shaped bottom; and,
   said first and second rail each have a top wall with said air bearing means fixedly attached thereto and are complementary in shape to said V shaped bottom.

8. The transportation means of claim 7 wherein:

said first arm of said third rail has a pair of plates spaced apart and extending longitudinally the length of said first arm, said plates are parallel and are supported and rigidly braced within said first arm, said plates have outer sides with vertical slots therein receiving said cables, said cables are insulated and connected to said source of power and wound to produce two linearly traveling magnetic fields.

9. The transportation means of claim 8 wherein: said first leg and said second leg each have conductors vertically mounted therein parallel to said first arm, said first leg and said second leg are positionable on either side of said first arm.

10. The high speed transportation means of claim 1 wherein:
said railway track is supported by two parallel and elevated I-beams in spaced relationship one to the other;
said first and second rails each include inverted L-shaped plates with horizontal and vertical surfaces supported by said I-beams, said plates including air bearing means connected to sources of compressed air, said third rail supported by said I-beams;
said first and second support and stabilization assemblies each have an inverted L-shape and are complementary in shape to said first rail and second rail; and,
said air bearing means ejecting air upwardly against said horizontal surfaces of said plates to support said vehicle and ejecting air against said vertical surfaces of said plates to guide said vehicle.

11. A high speed transportation means comprising:
a source for powering said transportation means of 3 phase high frequency electrical power;
a railway track connected to said source and including a first rail, a second rail being parallel to said first rail and spaced a fixed distance from said first rail and, an electrically charged third rail being positioned equidistant between and parallel with said first rail and said second rail, said third rail having a first arm with three cables wound therein connected to said source of electrical power for producing two linearly traveling magnetic fields;
a dual mode vehicle movably mounted on said railway track;
a first leg and a second parallel leg in spaced relation to each other and mounted centrally and longitudinally to and under said vehicle, said first and second leg having conductance and being positionable adjacent and on either side of said first arm of said third rail for moving through said fields and producing a force on said vehicle in the direction of said fields of said third rail;
a first support and stabilization assembly mounted longitudinally to and under said vehicle positionable adjacent said first rail for supporting and guiding said vehicle on said first rail;
a second support and stabilization assembly mounted longitudinally to and under said vehicle positionable adjacent said second rail for supporting and guiding said vehicle on said second rail;
air bearing means operable to provide an air cushion between said first rail and said first support and stabilization assembly for support of said vehicle and an air cushion between said second rail and said second support and stabilization assembly for support of said vehicle when said vehicle is positioned on said first rail and said second rail, said air bearing means being fixedly mounted to said first rail and said second rail; and,
retractable wheels rotatably mounted to and under said vehicle for supporting said vehicle when said vehicle is not mounted on said first rail, second rail and third rail.

12. The transportation means of claim 11 and further comprising a fitting connecting said first support and stabilization assembly and said second support and stabilization assembly to said frame; and wherein:
said vehicle has a specific center of gravity located by design and construction at the longitudinal center of said fitting allowing said vehicle to be supported equally by said air bearing means on said first support and stabilization assembly and said second support and stabilization assembly.

13. The transportation means of claim 11 wherein:
said first leg and said second leg are retractable into said vehicle; and,
said first and second support and stabilization assemblies each have a plate fixedly mounted horizontally to said vehicle and another plate hinged to said vehicle and pivotally movable from a vertical position when in use to a horizontal position when not in use.

14. The transportation means of claim 11 additionally comprising:
magnesium tipped skis fixedly mounted to said first and second support and stabilization assemblies being slidingly abuttable against said first and second rails to prevent contact between said support and stabilization assemblies and said first and second rails in case of failure of said air bearing means.

15. The transportation means of claim 11 additionally comprising:
a transport device having said first and second support and stabilization assemblies and said first and second legs fixedly attached thereto;
a fitting fixedly mounted centrally and longitudinally to and under said vehicle being removably connected to said transport device allowing said transport device to be removed from said vehicle when said dual mode vehicle is to be operated on said wheels;
magnesium tipped skis fixedly attached to said first and second support and stabilization assemblies being slidingly abuttable against said first and second rails to prevent contact between said support and stabilization assemblies and said first and second rail in case of failure of said air bearing means; and wherein:
said third rail has a second and third arm parallel with and positioned adjacent said first arm.

16. The transportation means of claim 15 wherein:
said first leg is positioned between said first and second arms and said second leg is positioned between said first and third arms.

17. The transportation means of claim 11 wherein:
said first and second support and stabilization assemblies each have a V shaped bottom; and,
said first and second rail each have a top wall with said air bearing means fixedly attached thereto and are complementary in shape to said V shaped bottom.

18. The transportation means of claim 11 wherein:

said first arm of said third rail has a pair of plates spaced apart and extending longitudinally the length of said first arm, said plates are parallel and are supported and rigidly braced within said first arm, said plates have outer sides with vertical slots therein receiving said cables, said cables are insulated and connected to said source of power and wound to produce two linearly traveling magnetic fields.

19. The transportation means of claim 11 wherein:

said first leg and said second leg each have inwardly facing surfaces with conductors vertically mounted therein parallel to said first arm, said first leg and said second leg are positionable on either side of said first arm.

20. The transportation means of claim 19 wherein:

said first leg and said second leg have outwardly facing surfaces and further comprising ferromagnetic plates attached to said first leg and said second leg and positioned on said outwardly facing surfaces to attract and concentrate magnetic flux of said magnetic field of said first arm.

21. A railway propulsion system comprising:

a source of 3 phase high frequency electrical power;

a railway having at least one first rail having a first arm with three cables wound therein connected to said source of electrical power to produce two linearly traveling magnetic fields;

a carrier frame having at least a first leg and a second parallel leg in spaced relation to each other and mounted thereto, said first and second leg having conductance and being positionable adjacent and on either side of said first arm of said first rail for moving through said fields and producing a force on said frame in the direction of said fields of said first arm, said frame further having first means to support said frame; and, means to receive said first means for supporting and guiding said frame along said railway and positioning said first and second leg adjacent and on either side of said first arm.

22. The propulsion system of claim 21 wherein:

said arm has a pair of plates spaced apart and extending longitudinally the length of said arm, said plates are parallel and are supported and rigidly braced within said arm, said plates have outer sides with vertical grooves therein receiving said cables, said cables are insulated and connected to said source of power and wound to produce two linearly traveling magnetic fields.

23. The propulsion system of claim 22 wherein:

said rail includes a second arm and a third arm parallel to said first arm, said second arm is spaced from said first arm with said first leg positioned therebetween, said third arm is spaced from said first arm with said second leg positioned therebetween.

24. The transportation means of claim 21 wherein:

said first and said second leg have inwardly facing surfaces comprising conductors vertically mounted therein parallel to said first arm, said first leg and said second leg are positionable on either side of said first arm.

25. The transportation means of claim 24 wherein:

said first leg and said second leg have outwardly facing surfaces and further comprising ferromagnetic plates attached to said first leg and said second leg and positioned on said outwardly facing surfaces to attract and concentrate magnetic flux of said magnetic field of said first arm.

26. The propulsion means of claim 21 and further comprising:

means mounted to said carrier frame being connected to said first and second leg and operable to retract said legs from an operating position adjacent said rail to a retracted position for storage when carrier is not being propelled along said railway.

* * * * *